(12) United States Patent
Marshall

(10) Patent No.: US 10,203,779 B2
(45) Date of Patent: Feb. 12, 2019

(54) METHODS AND SYSTEMS FOR RECEIVING USER INPUT UTILIZING A ROUND INTERACTIVE DEVICE

(71) Applicant: Nicholas George Arthur Marshall, Dubai (AE)

(72) Inventor: Nicholas George Arthur Marshall, Dubai (AE)

(*) Notice: Subject to any disclaimer, the term of this patent is extended or adjusted under 35 U.S.C. 154(b) by 0 days.

(21) Appl. No.: 15/614,792

(22) Filed: Jun. 6, 2017

(65) Prior Publication Data

US 2017/0269759 A1 Sep. 21, 2017

Related U.S. Application Data

(60) Provisional application No. 62/489,771, filed on Apr. 25, 2017, provisional application No. 62/353,840, filed on Jun. 23, 2016.

(51) Int. Cl.
*G06F 3/03* (2006.01)
*G06F 3/0354* (2013.01)
*G06F 3/0362* (2013.01)

(52) U.S. Cl.
CPC ........ *G06F 3/03547* (2013.01); *G06F 3/0362* (2013.01)

(58) Field of Classification Search
None
See application file for complete search history.

(56) References Cited

U.S. PATENT DOCUMENTS

| | | | |
|---|---|---|---|
| 9,175,983 B2* | 11/2015 | Bleckmann | G01D 5/2412 |
| 2004/0070568 A1* | 4/2004 | Bowen | G06F 3/0338 345/157 |
| 2004/0132498 A1* | 7/2004 | Clabunde | G05G 9/047 455/566 |
| 2008/0231595 A1* | 9/2008 | Krantz | H04N 7/163 345/156 |
| 2014/0267039 A1* | 9/2014 | Curtis | G06F 3/0338 345/161 |

* cited by examiner

*Primary Examiner* — Christopher J Kohlman

(57) ABSTRACT

A method and structure for receiving user input utilizing a round interactive device, where the round interactive device comprises a rotating bezel around a round capacitive touch screen that is attached to a uniquely designed base with push button functionality, all of which combined allow for user inputs to provide feedback regarding customer experiences.

6 Claims, 6 Drawing Sheets

METHODS AND SYSTEMS FOR RECEIVING USER INPUT UTILIZING A ROUND INTERACTIVE DEVICE

CROSS REFERENCE TO RELATED DISCLOSURE

This is disclosure claims the benefit of priority from U.S. Provisional Patent Application No. 62/353,840, filed on Jun. 23, 2016, and entitled "Interactive Feedback Device and Method for Use" and U.S. Provisional Patent Application No. 62/489,771, filed on Apr. 25, 2017, and entitled "Methods and Systems for Receiving User Input Utilizing a Round Interactive Device," which are incorporated herein by reference in their entirety.

TECHNICAL FIELD

This invention relates to an interactive device, and in particular the invention relates to method for manufacturing an interactive device and a method of utilizing it to collect user feedback.

BACKGROUND

Currently there are a number of solutions for collecting customer feedback after making a connection with a customer. One of these solutions attempts to use comment cards that are placed at the point of sale or at the point of closing the transaction, but this solution fails to meet the needs of the market as comment cards require action by a user and are often overlooked. Another solution attempts to use smart phone devices, email campaigns, and online ratings, but these solutions are similarly unable to meet the needs of the market as they too are often intrusive, require specific action by a user, and often are simply ignored.

However, none of these approaches are intuitively interactive or an actively engaging experience.

SUMMARY

An object of the invention is to provide new and improved methods and systems for collecting user feedback. The following presents a simplified summary of exemplary embodiments of the present disclosure in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter.

In an exemplary embodiment, a method for receiving customer feedback from a round shaped device. The method may comprise manufacturing the round shaped device by attaching a rotating bezel to a top surface of the round shaped device to form user input section of the round shaped device, wherein the top surface comprises of a round shaped capacitive touch screen, attaching a base to the user input section of the round shaped device, wherein the base comprises of an angled shaped enabling the top surface to be viewed at an angle by a respective user, and manufacturing and attaching a push functionality system between the base and the user input section to receive user input, wherein the push functionality comprises at least two contact points that determine application of pressure. They method may further comprise receiving first user input based on rotation of the rotating bezel, displaying alternative content based on the received first user input, receiving second user input based on push functionality or the capacitive touch screen, and transmitting the second user input along with user profile data.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for the purpose of illustration and description only and are not intended as a definition of the limits of the present disclosure. Embodiments of the present disclosure will now be described by way of example in association with the accompanying drawings in which.

DETAILED DESCRIPTION

Figure 1A:
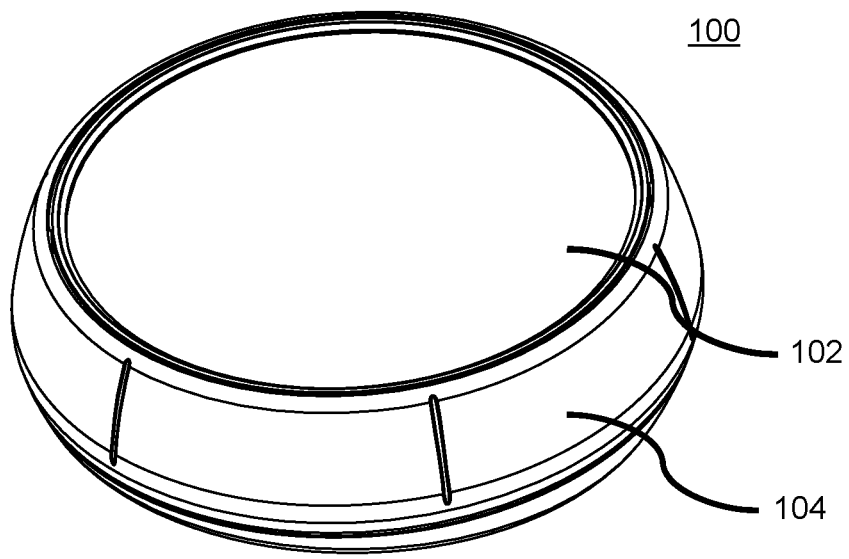
FIGS. 1A and 1B are sketches showing external layouts and functioning principles of a customer feedback device, consistent with exemplary embodiments of the present disclosure.

The novel features which are believed to be characteristic of the present invention, as to its structure, organization, use and method of operation, together with further objectives and advantages thereof, will be better understood from the following discussion.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. The figures discussed below provide details regarding exemplary systems that may be used to implement the disclosed functions.

Some concepts are described in form of steps of a process or method. In this form, certain operations are described as being performed in a certain order. Such implementations are exemplary and non-limiting. Certain operations described herein can be grouped together and performed in a single operation, certain operations can be broken apart into plural component operations, and certain operations can be performed in an order that differs from that which is described herein, including a parallel manner of performing the operations. The operations can be implemented by software, hardware, firmware, manual processing, and the like, or any combination of these implementations. As used herein, hardware may include computer systems, discrete logic components, such as application specific integrated circuits (ASICs) and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1B:
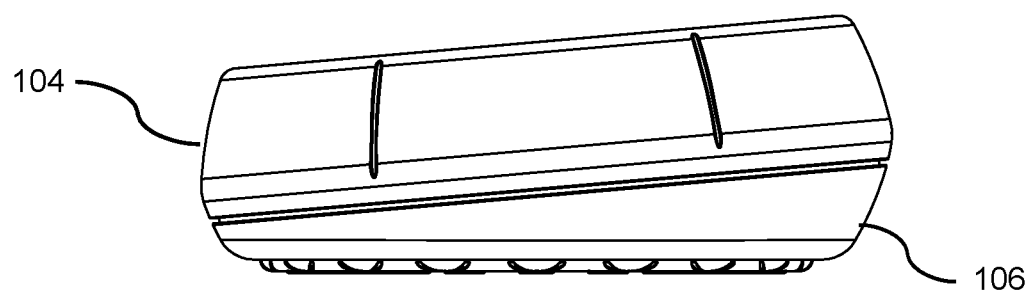

FIGS. 1A and 1B are sketches showing external layouts and functioning principles of a customer feedback device, consistent with exemplary embodiments of the present disclosure. For example, customer feedback device 100 is a round shaped device which is specifically configured and designed to collected user feedback by engaging a customer by providing an appealing and intuitive interface and ergonomic design. Customer feedback devices provides for tactile feedback due to presence of touch screen 102, bezel 104, and may be wirelessly connected to a network. In an exemplary embodiment, touch screen 102 is circular in shape and surrounded by bezel 104 which may twisting and be circular. Accordingly, touch screen 102 may display a user interface which may contain, questions, inquiries, selectable material or other data related to user experiences. Thereafter, bezel 104 may be twisted around touch screen for providing user input. Thus, user input may allow selection or choosing of various content viewable on touch screen 102. Customer feedback device 100 may also contain numerous other feature such as charging with a contactless charging base and may be enabled for various types of communication. This may include connecting communicating and exchanging information over WiFi, Bluetooth, near field communication, and other communication methods. In other embodiments, user input may be provided simply by touching of touchscreen 102 or applying of pressure to trigger a selection mechanism internal to customer feedback device 100 that is descried in further details with regards to FIGS. 2 and 3.

FIG. 1B illustrates in addition, to touchscreen 102 and bezel 104, base 106. Base 106 may be angled so that as is placed on a flat surface, it may allow for easier viewing by a potential user. Bottom of base 106 may include a gripping surface that will not scratch or leave marked on a surface that device 100 is placed upon. In exemplary embodiments, in device 100, an angle of base 106 may have a minimum height to a maximum height of device proportion between 3:5 to 4:5. In other embodiments, the minimum height to the maximum height of device proportion may be between 13:17 to 14:17. In exemplary embodiment, the minimum height may be 27.05 mm and the maximum height may be 34.05 mm.

Therefore, exemplary embodiment of customer feedback device provide a mechanism for providing feedback in real time after the customer user experience. User feedback which may be collected using exemplary devices allows for this feedback to be more efficiently collected, analyzed, and acted upon. Exemplary circular devices prompt a user with various questions based upon their experience in a convenient location in a non-intrusive manner. The display of an exemplary device allows a prompted user to leave feedback and the provider to act upon this feedback in real time. In exemplary scenarios, the device may be placed in an environment where the customer is located or it may be brought to a user towards the end of a customer experience, for example, with a bill for a meal. Thereafter, the user/customer may operate the exemplary circular device to easily and quickly provide feedback.

Figure 2:
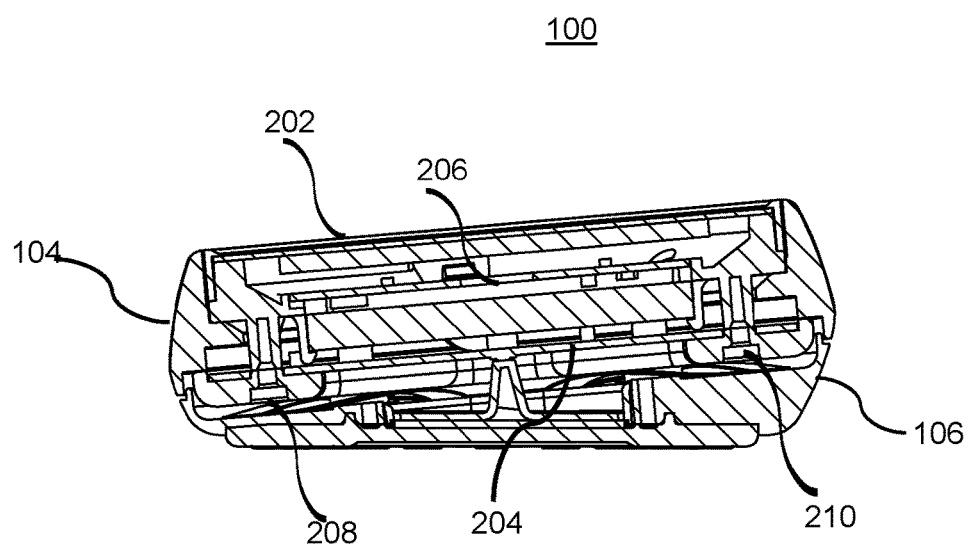
FIG. 2 provides an internal cross section of a customer feedback device, consistent with exemplary embodiments of the present disclosure.

FIG. 2 provides an internal cross section of a customer feedback device, consistent with exemplary embodiments of the present disclosure. For example, customer feedback device 100 is shown with a cross-section indicating a rotating bezel 104 attached to a top surface 202 of the round shaped device 100. In fact, top surface may comprise an exemplary top surface of touch screen 102. Touch screen 102 and bezel 104 may for external portions of user input section of exemplary device 100. As discussed above, customer feedback device 100 includes base 106 attached to the user input section. Exemplary base 106 comprises of an angled shape leading to formation of angled surface 204 which enables top surface 202 to be viewed at an angle by a respective user.

In exemplary embodiments, internally between base 106 and user input section is contained a push functionality system 206 to receive user input. In exemplary embodiments, the push functionality comprises at least two contact points that determine application of pressure. For example, contact points 208 and 210. Each of contact points 208 and 210 are associated with respective arrangement of T-bar leaf springs (not illustrated). Exemplary leaf springs may be of the same size, design, and functionality.

As is apparent in FIG. 2, respective bases of exemplary contact points 208 and 210, are co-planar and parallel with top surface 202 and co-planar with angled surface 204 of base 106 caused by the angled shape. Accordingly, Exemplary push functionality system 206 provides a unique spring configuration that enables a smoother and more balanced device depression while also removing almost all opposite side recoil if device 100 is depressed by a user with an off-center physical force. Specifically, cruciform arrangements of 'T' bar leaf springs, produce low friction, evenly distributed resistance to user activation push that provides clean haptic feedback for activation push.

In exemplary embodiments, device 100 utilizes an optical gate configuration to digitally monitor the twist function. The exemplary optical gate mechanism allows for positioning an infrared emitter and receptor on opposite sides of a perforated code stripe ring. In embodiments, perforations may be of a known size and a separation distance from one another. Accordingly, the size and separation distance may be utilized in conjunction with order of perforations and time intervals between received Infrared signals to extrapolate the direction and speed that the dial is being twisted. Utilizing an optical gate configuration provides for a achieving a high level of accuracy while at the same time allowing for effective sealing of device 100 to allow it to be water resistant.

Figure 3:
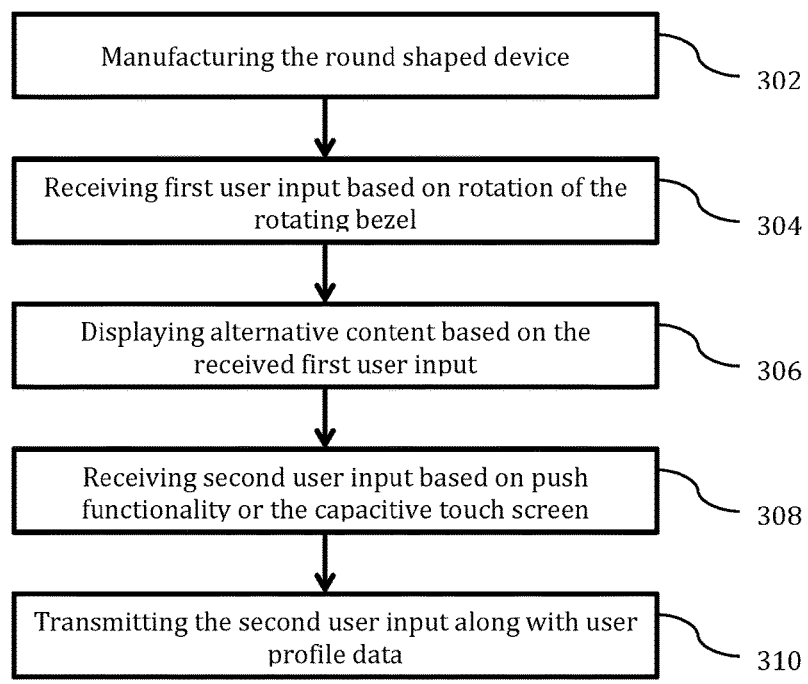
FIG. 3 illustrates an exemplary method for collecting customer feedback from a round shaped device, consistent with exemplary embodiments of the present disclosure.

FIG. 3 illustrates an exemplary method for collecting customer feedback from a round shaped device, consistent with exemplary embodiments of the present disclosure.

Figure 4:
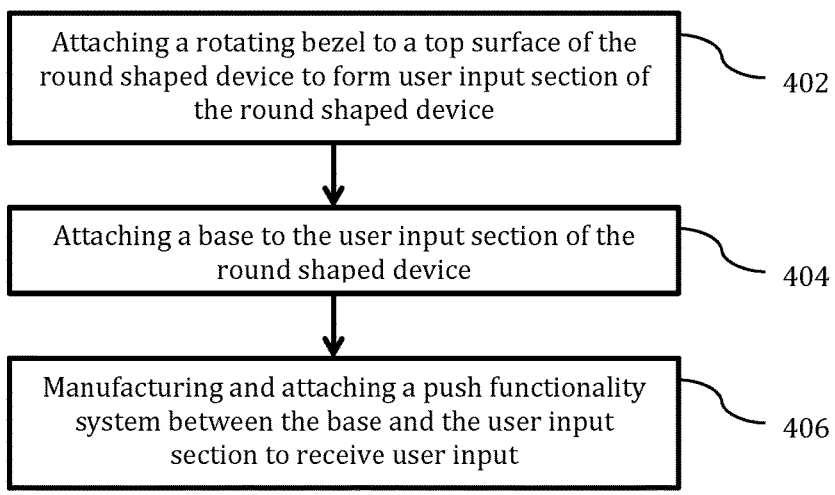
FIG. 4 illustrates an exemplary method for manufacturing the round shaped device, consistent with exemplary embodiments of the present disclosure.

Step 302 may comprise of manufacturing the round shaped device. FIG. 4 illustrates details of step 302, specifically it illustrates an exemplary method for manufacturing the round shaped device, consistent with exemplary embodiments of the present disclosure.

Step 402 comprise attaching a rotating bezel to a top surface of the round shaped device to form user input section of the round shaped device. In exemplary embodiment, the top surface may comprise of a round shaped capacitive touch screen, similar to touch screen 102. In exemplary embodiments, bezel 104 may be attached around touch screen 102.

Step 404 may comprise attaching a base to the user input section of the round shaped device, wherein the base comprises of an angled shaped enabling the top surface to be viewed at an angle by a respective user. For example, base 106 is attached to touch screen 102 and bezel 104.

Step 506 may comprise manufacturing and attaching a push functionality system between the base and the user input section to receive user input, wherein the push functionality comprises at least two contact points that determine application of pressure. Specific details regarding the manufacturing and design of exemplary push functionality system is described above with respect to FIG. 2.

Now back to method 400, step 404 may comprise receiving first user input based on rotation of the rotating bezel. In an exemplary embodiment, touch screen 102 may display questions or prompts requesting feedback from a customer or viewer sitting near a location containing device 100. User may rotate bezel 104 in either direction correlating to their rating or feeling in response to a prompt. In exemplary embodiments, rotation of bezel may simply lead to preselection of various content displayed on the screen. Accordingly, movement of bezel 104 may lead to various items on user interface of touch screen 102 being selected.

Step 406 may comprise displaying alternative content based on the received first user input. For example, content that is being displayed via user interface on touch screen 102 may be altered. For example, different content may be highlighted, or content may be moved, etc.

Step 408 may comprise receiving second user input based on push functionality or the capacitive touch screen. In exemplary embodiments, a user may provide additional user input based on push functionality, that is, applying pressure to touch screen 102 or bezel 104. In exemplary embodiments, the [push button functionality 202) allows an input to be entered. In exemplary embodiments, the second user input may refer to final selection of content displayed on exemplary touch screen 102.

Step 410 may comprise transmitting the second user input along with user profile data. In exemplary embodiments, user profiles associated with users may be created or updated which may be transmitted along with user inputs. User profiles may be based on available data associated with a user. This may include demographic information including age, sex, race, income, but may also include information such as previous habits including spending habits or eating habits. At minimal said information may include the timings that a user was at a particular location, and this information may be crossed referenced with their amount of spending and the nature of their spending to create a user profile, if not additional information is available. For example, based on user feedback, a location may determine that individuals who have drinks at their establishment in the afternoon are the most satisfied customers but the food related customers in the afternoon are not satisfied by the food quality. This level of feedback without taking into account even detailed user demographic may allow an institution to more efficiently run their business operations in terms of customer retention.

In exemplary embodiments, microphones within exemplary device 100 may be used to capture or receive ambient noise. The captured ambient noise may be utilized using artificial intelligence engines to perform advanced market segmentation and analysis against tonal inflections and custom linguistic triggers.

Figure 5:
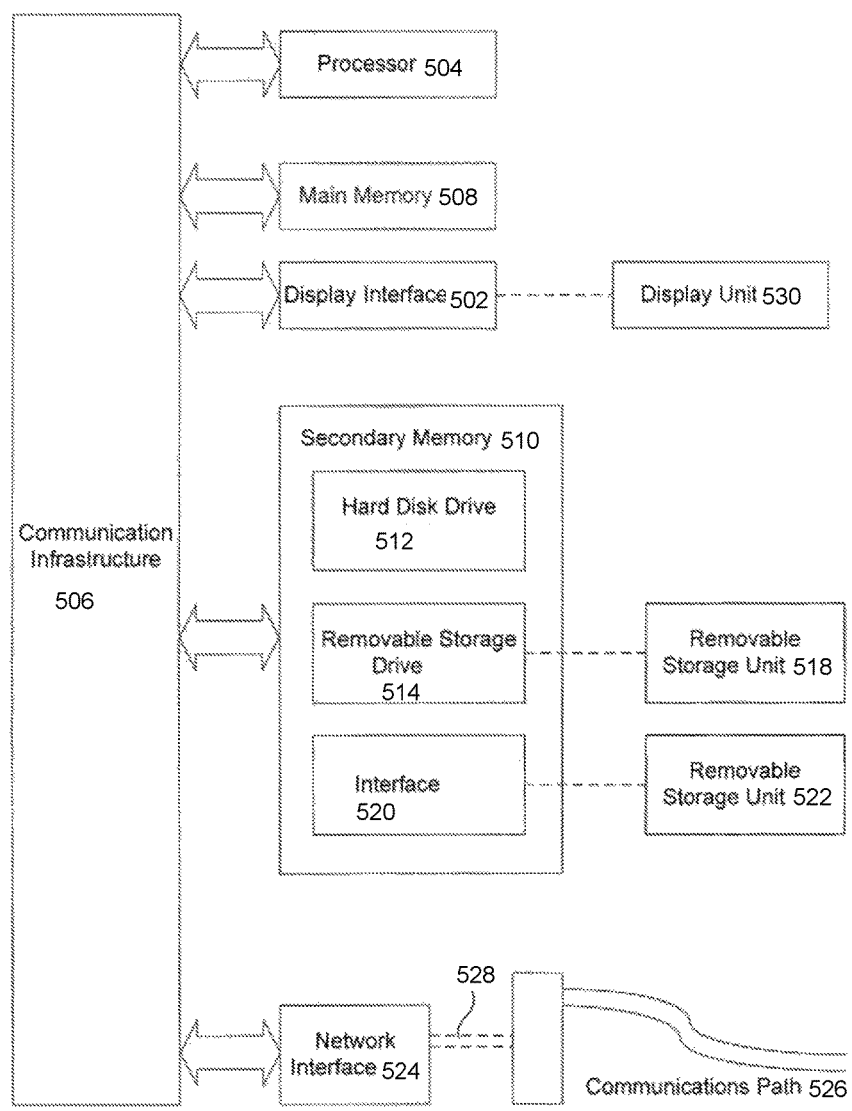
FIG. 5 illustrates an example computer system 500 in which an embodiment of the present invention, or portions thereof, may be implemented as computer-readable code, consistent with exemplary embodiments of the present disclosure.

FIG. 5 illustrates an example computer system 500 in which an embodiment of the present invention, or portions thereof, may be implemented as computer-readable code, consistent with exemplary embodiments of the present disclosure. For example, device 100 may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-2.

If programmable logic is used, such logic may execute on a commercially available processing platform or a special purpose device. One of ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 606, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc., which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 600.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 808 and/or secondary memory 510. Computer programs may also be received via communications interface 524. Such computer programs, when executed, enable computer system 500 to implement the present invention as discussed herein. In particular, the computer programs, when executed, enable processor device 504 to implement the processes of the present invention, such as the operations in the method illustrated by flowchart 300 of FIG. 3 and flowchart 400 of FIG. 4 discussed above. Accordingly, such computer programs represent controllers of the computer system 500. Where the invention is implemented using software, the software may be stored in a computer program product and loaded into computer system 500 using removable storage drive 514, interface 520, and hard disk drive 512, or communications interface 524.

Embodiments of the invention also may be directed to computer program products comprising software stored on any computer useable medium. Such software, when executed in one or more data processing device, causes a data processing device(s) to operate as described herein. An embodiment of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A method for receiving customer feedback from a round shaped device, comprising:
    manufacturing the round shaped device, where manufacturing the round shaped device comprises:
    attaching a rotating bezel to a top surface of the round shaped device to form user input section of the round shaped device, wherein the top surface comprises of a round shaped capacitive touch screen, the round shaped capacitive touch screen configured to display images;
    attaching a base to the user input section of the round shaped device, wherein the base comprises of an angled shape enabling the top surface to be viewed at an angle by a respective user and a size of the base corresponding to a size of the user input section;
    manufacturing and attaching a push functionality system between the base and the user input section to receive user input, wherein:
        the push functionality comprises at least two contact points that determine application of pressure;
        each of the at least two contact points associated with respective cruciform arrangement of T-bar leaf springs of the same size, each of the respective cruciform arraignment of T-bar leaf springs in the shape of a T-bar and configured to provide evenly distributed resistance to user activation push; and
        respective bases of the at least two contact points are co-planar and parallel with the top surface and co-planar with an angled surface of the base caused by the angled shape;
    receiving first user input based on rotation of the rotating bezel;
    displaying alternative content based on the received first user input;
    receiving second user input based on push functionality or the capacitive touch screen; and
    transmitting the second user input along with user profile data.

2. The method of claim 1, wherein there is a 7 mm difference between a minimum height and a maximum height of the base.

3. The method of claim 2, wherein there is a 7 mm difference between a minimum height and a maximum height of the device.

4. The method of claim 1, wherein the user profile data comprises demographic data associated with a user.

5. The method of claim 1, wherein the bezel is rotatable in a clockwise or a counterclockwise direction.

6. The method of claim 1, wherein the contact points are connected to an internal base structure internal to the base at an angle.

* * * * *